United States Patent [19]

Osborne

[11] 3,862,337

[45] Jan. 21, 1975

[54] FEED COMPOSITION

[76] Inventor: Jaime Melgarejo Osborne, Avda. Republica Argentina 5, Sevilla, Spain

[22] Filed: Mar. 9, 1973

[21] Appl. No.: 339,955

Related U.S. Application Data

[63] Continuation-in-part of Ser. No. 26,396, April 7, 1970, abandoned.

[30] Foreign Application Priority Data

May 14, 1969 Spain .................................. 367258

[52] U.S. Cl. .......................... 426/2, 426/60, 426/62, 426/204, 426/807, 195/74
[51] Int. Cl. .............................................. A23k 1/06
[58] Field of Search ......... 426/60, 62, 349, 11, 204, 426/72, 807, 218; 195/74

[56] References Cited
UNITED STATES PATENTS

| | | | |
|---|---|---|---|
| 660,008 | 10/1900 | Eichelbaum | 426/60 |
| 2,440,545 | 4/1948 | Jeffreys | 195/82 |
| 2,508,112 | 5/1950 | Haugh | 426/62 |
| 2,926,084 | 2/1960 | Geerlings | 99/2 |
| 2,946,688 | 7/1960 | Rosenthal et al. | 426/60 |
| 2,999,753 | 12/1961 | Witwicka et al. | 426/60 |

FOREIGN PATENTS OR APPLICATIONS

| 26,697 | 7/1913 | Great Britain | 426/204 |
|---|---|---|---|

*Primary Examiner*—A. Louis Monacell
*Assistant Examiner*—Curtis P. Ribando
*Attorney, Agent, or Firm*—Wenderoth, Lind & Ponack

[57] ABSTRACT

A novel animal feed is obtained from liquid by-products of beer manufacture, containing yeast in suspension. By treatment with sodium chloride, harmful microorganisms in the said liquid by-products are destroyed, thereby rendering said by-products suitable for use as animal feeds.

7 Claims, No Drawings

FEED COMPOSITION

This is a continuation-in-part of Ser. No. 26,396, filed Apr. 7, 1970, and now abandoned The present invention is directed to a process for utilizing brewery residues containing yeast in suspension as an animal feed. The said residues are adapted to the requirements of digestion by an autolytic process which is based on slight increases of temperature and which may be activated by an addition of ordinary salt or sodium chloride in any proportion. The liquid by-products obtained in beer manufacture contain 12 to 15% yeast (dry matter) in suspension.

The residues used as the raw material in the process of the patent application are commonly known as brewery yeasts and are the yeasts used in the manufacture of beer. This yeast settles in the bottom of the main or secondary fermentation tanks, wherefrom it is collected to form the starting material of the process claimed.

Suitable suspensions of brewery yeasts may also originate from top rising as well as from bottom rising yeasts. The suspension is the resultant by-product of the manufacture of beer, in its fermentation and ripening or storage stages.

A typical composition of such a yeast broth would be, for example:

| | |
|---|---|
| Proteins (digestible) | about 4% |
| Non-nitrogen extract up to 7 or 8% (digestible) | |
| Ashes | up to 1% |
| Fats materials (digestible) | about 0.2% |
| Cellulose | about 0.2% |
| Vitamin $B_1$ | about 2–3 mgs/100 gr. |
| Vitamin $B_2$ | about 0.4–0.6 mgs/100 gr. |
| Nicotinic acid | up to 10 mgs. |

The autolysis process is effected by means of addition of sodium chloride to the suspension of yeast until a concentration of 3.5 to 5% sodium chloride is attained.

The process is operable at room temperature, although optimal conditions are realized at temperatures between 32° and 36°C with a sodium chloride concentration of 3.5 to 4% for a time sufficient to achieve substantial autolysis.

When the above yeasts are subject to analysis in a dry state, the following average values are obtained:

| | |
|---|---|
| The total amount of dry material | 91.0% |
| Digestible protein | 33.5% |
| Fats | 2.0% |
| Fiber | 6.0% |
| Non-nitrogen extract | 30.0% |
| Inorganic materials | 14.0% |
| Calcium | 0.14% |
| Phosphorus | 1.56% |
| Potassium | 0.11% |
| Thiamine | 80 mg per kg |
| Riboflavin | 35 mg per kg |
| Pantothenic acid | 100 mg per kg |

Thus, it is clear that this material has a high content of vitamin B and proteins. The material is suitable as an animal feed provided that the living substances affecting the digestive process are destroyed.

The studies leading to the utilization of brewery yeast for animal feed have been directed toward the production of an inert liquid (broth) which contains a high amount of protein on account of cellular destruction and which also preserves the vitamins, by means of an accelerated autolysis and a slight increase of temperature.

Initially, the death rate of *Saccharomyces carlsbergensis* at various temperatures (as a function of time) and the content of nitrogen were measured with the following results:

| TEMPERATURE | PERCENTAGE DEAD CELLS | | SOLUBILIZED NITROGEN (mg. $N_2$/100 ml.) | |
|---|---|---|---|---|
| °C | 5 Hours | 25 Hours | 5 Hours | 25 Hours |
| 5° | 6 | 8 | 63 | 67 |
| 10° | 6 | 8 | 66 | 75 |
| 25° | 20 | 28 | 74 | 132 |
| 40° | 35 | 100 | 144 | 634 |

In view of the results of the tests, an attempt was made to accelerate the autolytic process, in order to activate the treatment in a day at 40°C, and the tests were repeated with an addition of 5% of ordinary salt or sodium chloride to the suspension of yeast. The results are shown in the following Table:

| TEMPERATURE | PERCENTAGE DEAD CELLS | | SOLUBILIZED NITROGEN (mg. $N_2$/100 ml) | |
|---|---|---|---|---|
| °C | 5 Hours | 25 Hours | 5 Hours | 25 Hours |
| 5° | 18 | 72 | 97 | 119 |
| 10° | 18 | 86 | 105 | 145 |
| 25° | 82 | 96 | 128 | 287 |
| 40° | 82 | 100 | 189 | 641 |

Similar results are found with *Saccharomyces cerevisiae*.

Thus, the cited data indicate a successful activation of the process. Only the optimal operating conditions, with regard to temperature and saline concentration, were still to be determined. After a number of tests repeated with various agents for activating the autolysis and at various temperatures, the optimal operating conditions were determined as 3.5–4.0% sodium chloride concentration and 32°–36°C as the range of temperature of operation.

At elevated temperatures, approximately 40°C, and during a sufficient period of time, approximately 5–6 hours, total mortality of the yeast may be obtained without salt. Autolysis is started, i.e. the solubilization of proteins and vitamins with a resulting increase in the digestibility of the product. A decaying process will also be produced, which will prevent the cattle from consuming the product. If the temperature and conditions are too severe, this decaying process or heterolysis will predominate.

However, by adding a small amount of sodium chloride (from 3–5%) and keeping the temperature below 40°C, the decaying effects are eliminated, and the salt gives a flavor to the product which makes it very appetizing for cattle. In fact, by adding sodium chloride, the following effects, not provided for up to now, are obtained:

I. The almost instantaneous destruction of the yeast is produced, in such a way that the autolysis rather than decomposition begins first and with a greater intensity than when the yeast is only treated at high temperatures.

II. The addition of sodium chloride favors the solubilization of the nitrogen, perhaps by a simple osmotic effect, in such a way that the ratio of the amount of soluble nitrogen to the percentage of sodium chloride added is linear and has a very high gradient.

III. The addition of sodium chloride protects the product obtained against the development of bacterial infections, since it tends to eliminate the growth of the non-osmotic bacterial infectant flower.

IV. As stated previously, the addition of sodium chloride lends to the product a special appetisement for the cattle, especially for bovine cattle.

V. Another important advantage of the addition of sodium chloride is that the resultant product may be preserved, while with the simple treatment of the yeast at 40°C preservation would be impossible, since the decaying process will continue uninterruptedly.

VI. The product has a slight alcoholic content, i.e. about 3%. It has been noted that small amounts of ethyl alcohol improve the cattle's ability to digest dried vegetable matter such as hay or straw.

From the results obtained we infer as follows:

1. When the yeast-containing liquid (broth) is heated in the state existing at the end of the manufacturing process, a fierce disintegration takes place at a temperature of 40°C, even without addition of salt, and there is obtained a total mortality of the living cells.

2. In the final state, the pH of the liquid changes from 5.00 to 5.5–5.8.

3. After the solid material is separated by centrifugation, the content of free nitrogen is changed from 60/70 mg. per 100 ml., to 640–690 mg.

4. When the proportion of sodium chloride is at the level of 5%, its deadly effect is manifested after a short time, even at low temperature. Beyond 25%, the destructive effect increases rapidly and it may be considered as total 5 hours after the admixture.

The following Example is illustrative but not limiting:

EXAMPLE

A liquid broth containing 12 to 15% yeast (*Saccharomyces carlsbergensis*) in suspension obtained in beer manufacture is used as a starting material. It is obtained by removal from fermentation or storage tanks. The liquid is placed in a tank equipped with an agitation device.

Ordinary salt (sodium chloride) is added to the suspension of yeast so as to be dissolved and mixed therein by means of a centrifugal pump which produces a strong agitation. The salt concentration in solution is 4.0%.

The duration and temperature of the treatment is for 5 hours at 32° to 36°C. After completion of the treatment, the autolyzed yeast is kept in the tanks wherein the destruction of cells is carried out over a period of 24 hours. The destructive process is carried out on the living substances, which increases the content of digestible nitrogen to a value 10 to 15 times higher than the original content.

At the end of the storage period, at ambient temperature, the state of the material permits its immediate utilization in mixture of other components of live-stock feed. The autolysis may also be performed in a chamber of a different kind equipped with a forced circulation of yeast in a coil or piping, surrounded by hot water at the desired temperature. The following tests indicate the suitability of the novel preparations as live-stock feeds. The tests were carried out on an industrial scale and in vivo by feeding horned cattle during periods of gestation and growth as well as pigs and horned cattle for fattening purposes. The following results were obtained:

1. Several Andalusian Retinta cows were stalled and fed exclusively with an animal feed consisting of brewery cakes and autolyzed yeast. All other types of food were excluded and even litter straw was not used on the floor in order to avoid its consumption by the animals.

The satisfactory results were accompanied by normal gestation and delivery; for several months mother milk was used exclusively for raising the calves that preserved the normal weight and good appearance.

2. The following feed was given to the animals to be fattened:

a. To pigs: 6–8 kg brewery cakes, according to ages, and 25% of liquid autolyzed yeast.

b. To calves: 10–15 kg brewery cakes and 25% autolyzed yeast.

The growth of the first amounted to 480 g per day and that of the latter to 780 g per day during a first period, and 960 g per day during a second period. Vitamin deficiency was not observed in the two cases.

As the conclusion of the above tests, which lasted for more than a year, it was determined that the testing period for establishing the usefulness of the autolyzed yeast as a feed for live-stock of any kind was successful. Success was also realized on feeding the autolyzed yeast to hens and horses.

I claim:

1. An aminal feed comprising a product produced by the process which consists essentially of collecting a yeast suspension from the fermentation or ripening of beer, said suspension containing 12–15% yeast and up to 3% ethyl alcohol adding to said suspension sodium chloride until the concentration of sodium chloride is 3.5 to 5%, and maintaining said suspension at 32° to 36° for a period of time sufficient to destroy harmful microorganisms in said suspension and to autolyze but not heterolyze the yeast.

2. A feed according to claim 1 wherein the time of treatment is at least 5 hours.

3. A feed according to claim 2 wherein the yeast is *Saccharomyces carlsbergensis* or *Saccharomyces cerevisiae*.

4. A feed according to claim 3 wherein the time of treatment is between 5 and 25 hours.

5. A feed according to claim 1 wherein the time of treatment is between 5 to 25 hours.

6. A method of producing an animal feed which consists essentially of collecting a yeast suspension from the fermentation or ripening of beer, said suspension containing 12–15% yeast and up to 3% ethyl alcohol, adding to said suspension sodium chloride until the concentration of sodium chloride is 3.5 to 5%, and maintaining said suspension at 32° to 36°C for a period of time sufficient to destroy harmful microorganisms in said suspension and to autolyze but not heterolyze said yeast.

7. A method for fattening cattle, pigs, hens or horses which comprises feeding them an animal feed comprising: a product produced by the process which consists essentially of collecting a yeast suspension from the fermentation or ripening of beer, said suspension containing 12–15% yeast and up to 3% ethyl alcohol, with adding to said suspension sodium chloride until the concentration of sodium chloride is 3.5 to 5%, and maintaining said suspension at 32° to 36°C for a period of time sufficient to destroy harmful microorganisms in said suspension and to autolyze but not heterolyze the yeast, said product being fed in an amount effective to fatten said cattle, pig, hens or horses.

* * * * *